June 30, 1964 F. E. DE MOTTE 3,139,530

PLURAL RANDOM PHASE, SERIES-CONNECTED A.C. SOURCES

Filed Oct. 22, 1959

INVENTOR
F. E. DEMOTTE
BY
ATTORNEY 3,139,530

PLURAL RANDOM PHASE, SERIES-CONNECTED A.C. SOURCES

Frank E. De Motte, New Vernon, N.J., assignor to Bell Telephone Laboratories, Incorporated, New York, N.Y., a corporation of New York Filed Oct. 22, 1959, Ser. No. 848,162
7 Claims. (Cl. 307—75)

This invention relates to signal sources and in particular to sources for producing timing or "clocking" signals.

In electronic apparatus in which wave trains are used for timing or clocking purposes it is generally desirable that these wave trains not fail because of the failure of a component in the circuitry generating them. Such failures in computer apparatus, for example, may produce a result which unknowingly is inaccurate or if known to be inaccurate requires that the operation be started anew. One technique that has been suggested to reduce the possibility of the loss of such wave trains requires the use of two or more oscillators which are mutually coupled so as to be synchronized with one another. Through the use of this technique an output is produced as long as at least one of the oscillators continues to operate. The actual number of oscillators that are used when employing this technique of course depends upon the degree of reliability desired. It has been found, however, that when mutually coupling together more than two oscillators the output produced by the combination tends to become unstable.

It has also been found that clocking wave trains in many pieces of apparatus may be phase modulated without affecting the function performed by the apparatus. In other words, it is not necessary that all periods of a clocking wave train be of the same duration. An example of such apparatus is a binary counter stage which changes state in response to particular amplitude levels of a clocking wave train even though the time intervals between these amplitude levels are not of the same duration.

An object of the present invention is to produce through the use of two or more oscillators a substantially stable wave train which may be phase and amplitude modulated but which does not fail as a result of the failure of any one or more but not all of the oscillators.

The present invention adds together two or more alternating voltages to produce an output signal which never falls below a predetermined minimum peak amplitude as long as at least one of the alternating voltages is present. (In the remainder of this discussion, all amplitudes are meant to be peak values; e.g., a "minimum amplitude" is meant to mean a "minimum peak amplitude". In accordance with the invention, all of the alternating voltages have random phase relationships with respect to one another but have frequencies which are nominally equal to substantially the same frequency so as to be individually capable of providing a frequency of sufficient accuracy to operate the utilization apparatus. The amplitudes of each of these voltages at the point of summation differ from one another so that the minimum amplitude of the smallest amplitude voltage is at least equal to the predetermined minimum amplitude of the output signal, and each of the minimum amplitudes of the remaining voltages is greater by at least the predetermined minimum amplitude than the sum of the maximum amplitudes of all of the voltages having smaller amplitudes. When adding together two alternating voltages meeting these requirements, for example, the minimum amplitude of a first one of the voltages should be at least equal to the predetermined minimum output signal amplitude, while the minimum amplitude of the second should be greater than the maximum value of the first by at least the predetermined minimum output signal amplitude. When these two voltages are in phase with one another the output signal amplitude is at least three times its predetermined minimum amplitude, whereas when they are out of phase with respect to one another the output signal amplitude is at least equal to its predetermined minimum amplitude. In the absence of one or the other of these two voltages the output signal comprises the remaining voltage which is always at least equal to the predetermined minimum amplitude. As will become apparent in the following discussion of the disclosed embodiments of the invention, similar results are obtained when more than two voltages meeting these requirements are added together. Furthermore, although the frequency of the output signal is phase modulated when the frequencies of the alternating voltages are not equal to one another, such modulation is acceptable in many applications, as previously mentioned.

In one embodiment of the invention a plurality of similar oscillators provides voltages which are substantially equal to one another in amplitude. These voltages are applied across the primary windings of the respective transformers which have their secondary windings connected in series with one another and a utilization circuit. The transformers are chosen so that the minimum amplitude of the voltage appearing across the secondary winding of one of them is at least equal to a desired predetermined minimum amplitude of the signal applied across the utilization circuit while the minimum amplitudes of the voltages appearing across the secondary windings of the remaining transformers are each greater by at least the predetermined minimum utilization circuit amplitude than the sum of the maximum values of the lesser secondary winding voltages.

In another embodiment of the invention a plurality of oscillators provides voltages which differ from one another in amplitude so that the minimum amplitude is at least equal to a predetermined minimum amplitude, and each of the minimum values of the remaining amplitudes is greater by at least the predetermined minimum amplitude than the sum of the maximum values of all of the lesser amplitudes. These voltages are applied across the primary windings of respective transformers which are identical to one another and which have their secondary windings connected in series with one another and a utilization circuit.

A feature of the invention is an arrangement which is adapted to render an oscillator in these or other embodiments inoperative when its output voltage falls either below a minimum amplitude or above a maximum amplitude. In the absence of this feature, as should become apparent from the following discussion, it is possible for the amplitude of the signal applied to the utilization circuit to fall below its predetermined minimum level.

Other objects and features of the invention will become apparent from a study of the following detailed descriptions of several specific embodiments of the invention.

Figure 1:
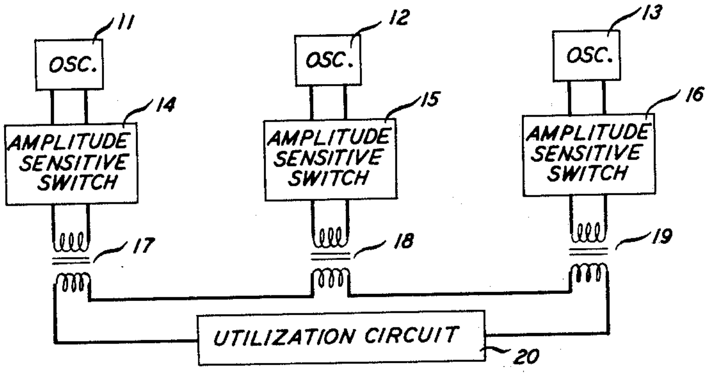
FIG. 1 is a block diagram representing several embodiments of the invention.

The block diagram of FIG. 1 represents several embodiments of the invention. In the following discussion, the block diagram is considered in general before discussing two specific embodiments that it represents.

In FIG. 1 oscillators 11, 12 and 13 supply voltages which are substantially constant in amplitude and equal in frequency and in random phase relationship with respect to one another. In accordance with the invention, the amplitudes of each of these voltages should either be within prescribed maximum and minimum limits (to be discussed subsequently) or the voltage should be blocked or otherwise prevented from affecting the remainder of the circuit. This is accomplished in the block diagram of FIG. 1 by amplitude-sensitive switches 14, 15 and 16 which are adapted to pass the oscillator voltages only when their amplitudes are within their prescribed limits. The amplitude-sensitive switches are unnecessary when the oscillators inherently control their respective output voltage amplitudes. When passed by amplitude-sensitive switches 14, 15 and 16, the voltages are applied across respective primary windings of transformers 17, 18 and 19. The secondary windings of transformers 17, 18 and 19 are connected in series with one another and a utilization circuit 20.

In one of the embodiments represented by the block diagram of FIG. 1 the output voltages of oscillators 11, 12 and 13 are normally substantially equal in amplitude. When the amplitudes of these voltages are within prescribed maximum and minimum limits they are passed to transformers 17, 18 and 19 by amplitude-sensitive switches 14, 15 and 16, respectively. In this embodiment, the turns ratios of transformers 17, 18 and 19 are chosen so that the minimum amplitude of the voltage across the secondary winding of transformer 17 is at least equal to the minimum permissible amplitude of the signal desired across utilization circuit 20, the minimum amplitude of the voltage across the secondary winding of transformer 18 is at least equal to the maximum amplitude of the voltage across the secondary winding of transformer 17 plus the minimum permissible utilization circuit input signal amplitude, while the amplitude of the minimum voltage across the secondary winding of transformer 19 is at least equal to the summation of the maximum amplitudes of the voltages across the secondary windings of transformers 17 and 18 plus the minimum permissible utilization circuit input signal amplitude. This may be expressed mathematically as follows:

$$A_{min} \geqq E_{min}$$
$$B_{min} \geqq A_{max} + E_{min}$$
$$C_{min} \geqq A_{max} + B_{max} + E_{min}$$

where A, B and C are the peak amplitudes of the voltages across the secondary windings of transformers 17, 18 and 19, respectively, and $E_{min}$ is the minimum permissible peak amplitude of the utilization circuit input signal. The maximum and minimum values of the secondary winding voltages take into account the fact that the oscillator voltage amplitudes may vary from time to time and that these variations, within limits, should not adversely affect the operation of the combination. Limits must be maintained, as set forth in the equations, so that the output signal amplitude will not fall below its predetermined level. These maximum and minimum levels are established by the amplitude-sensitive switches. From these equations, it is readily apparent that as long as the output from at least one of the oscillators is passed by one of the amplitude-sensitive switches, the amplitude of the signal applied to utilization circuit 20 is at least equal to $E_{min}$.

Figure 2:
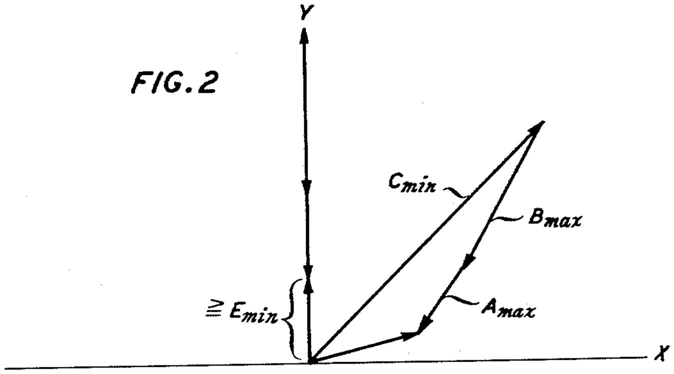
FIG. 2 illustrates vector summations of voltages occurring in the circuits represented by FIG. 1.

The above stated peak amplitude requirements may be better understood by referring to FIG. 2 in which two vector summations are shown. As in conventional vector representations the vectors represent the peak amplitudes of the voltages and rotate in a counterclockwise direction with the sine values of the vectors (i.e., their projection onto the Y axis) at any particular instant representing the amplitudes of the voltages at that instant. In one of the summations of FIG. 2 the vectors $A_{max}$ and $B_{max}$ are in phase with one another along the Y axis while the vector $C_{min}$ is in phase opposition along the same axis. Because these vectors coincide with one another and are therefore somewhat difficult to identify, another summation of the same vectors at an earlier time is shown in FIG. 2 where the vector $C_{min}$ is at approximately a 45 degree angle with respect to the Y axis. The phase displacements of the vectors $A_{max}$ and $B_{max}$ are chosen so that their frequencies are slightly less than that of the vector $C_{min}$ although they may have other frequency relationships as appreciated by those skilled in the art. As the vectors $A_{max}$, $B_{max}$ and $C_{min}$ rotate, the resulting vector projected onto the Y axis represents a phase and amplitude modulated signal having an average frequency and phase relationship equal to that of the voltage represented by the vector $C_{min}$. The minimum peak value of the phase and amplitude modulated output vector occurs when the vectors coincide as shown in FIG. 2. The fact that this is the minimum peak value may be appreciated by rotating the vector $C_{min}$ through 360 degrees while considering all of the possible positions of the vectors $A_{max}$ and $B_{max}$. All other possible combinations of the vectors $A_{max}$ and $B_{max}$ will produce peak amplitudes of the output vector which are greater than the one shown in FIG. 2.

In another embodiment of the invention represented by the block diagram of FIG. 1 each of the transformers 17, 18 and 19 are identical, and the differences in the secondary voltage amplitudes, as expressed in the above equations, are achieved by applying different amplitude voltages to the primary windings of the transformers. These different amplitude voltages may be produced by the oscillators directly, by voltage dividing means prior to the primary windings, or by combinations of these two techniques. Various other summing and voltage dividing arrangements found in the prior art may be employed in practicing the invention. Resistive networks may be used, for example, to perform these functions. Furthermore, voltage dividing networks may be regarded as included in the output circuits of the oscillators or they may be inserted either before or after the amplitude-sensitive switches. The block diagram of FIG. 1 thus serves to illustrate each of these equivalent embodiments.

Figure 3:
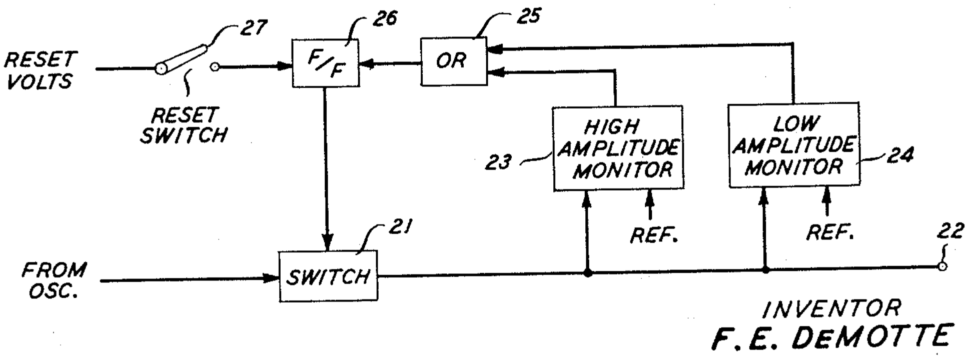
FIG. 3 is a block diagram of an arrangement that may be used for the amplitude-sensitive switches contained in the block diagram of FIG. 1.

FIG. 3 is a block diagram of an arrangement that may be used for each of the amplitude-sensitive switches of FIG. 1. One of the oscillator alternating voltages is applied to a switch 21 which, when enabled, applies this voltage to a terminal 22. A high amplitude monitor 23 and a low amplitude monitor 24 are each connected to terminal 22. A reference potential is applied to each of the monitors 23 and 24. Monitor 23 produces an output when the oscillator voltage amplitude exceeds a predetermined level, while monitor 24 produces an output when the oscillator voltage amplitude falls below a predetermined level. The outputs of monitors 23 and 24 are applied to an OR gate 25 which in turn has its output applied to one input of a flip-flop circuit 26. The other input of flip-flop circuit 26 is connected to a reset switch 27 while an output is connected to switch 21. Reset switch 27 is used for placing flip-flop circuit 26 in the condition where its output enables switch 21. When monitor 23 or monitor 24 produces an output, flip-flop circuit 26 is placed on its other condition so that its output disables switch 21. This arrangement, therefore, permits the oscillator voltage to be applied to terminal 22 only when its amplitude falls within the limits established by monitors 23 and 24. Other amplitude-sensitive switches may be used without departing from the spirit and scope of the present invention.

Although only two embodiments of the invention have been described in detail, it is to be understood that various other embodiments may be devised by those skilled in the art without departing from the spirit and scope of the invention.

What is claimed is:

1. Apparatus for producing a signal having a peak amplitude at least equal to a predetermined value comprising a plurality of sources for producing alternating voltages having nominally equal frequencies, random phase relationships with respect to one another and peak amplitudes such that the smallest of said amplitudes is at least equal to said value and each of the remaining of said amplitudes is greater by at least said value than the sum of all of the smaller of said amplitudes, means for summing said voltages, and means for blocking from said summing means any one of said voltages when its amplitude does not fall within its prescribed limits.

2. Apparatus for producing a signal having a peak amplitude at least equal to a predetermined value comprising a plurality of sources for producing alternating voltages having frequencies nominally equal to the same frequency and random phase relationships with respect to one another, the minimum peak amplitude of the smallest peak amplitude voltage being at least equal to said value and the minimum peak amplitude of each of the remaining voltages being greater by at least said value than the sum of the maximum peak amplitudes of all of the voltages having smaller peak amplitudes, means for summing said voltages, and means for blocking from said summing means any one of said voltages when its amplitude does not fall within its prescribed limits.

3. Apparatus for producing a signal having a peak amplitude at least equal to a predetermined value comprising a plurality of sources for producing alternating voltages having nominally equal frequencies and random phase relationships with respect to one another, means associated with said sources for initially establishing the peak amplitudes of their voltages so that the minimum peak amplitude of the smallest peak amplitude voltage is at least equal to said value and the minimum peak amplitude of each of the remaining voltages is greater by at least said value than the sum of the maximum peak amplitudes of all of the voltages having smaller peak amplitudes, means for summing said voltages, and means for blocking from said summing means any one of said voltages when its amplitude does not fall within its prescribed limits.

4. Apparatus for producing a signal having a peak amplitude at least equal to a predetermined value comprising a plurality of sources for producing alternating voltages having nominally equal frequencies and random phase relationships with respect to one another, a similar plurality of transformers each having a primary winding and a secondary winding, means for respectively applying said source voltages across said primary windings only when said source voltages are between predetermined maximum and minimum amplitudes, said transformers having turns ratios so that the minimum peak amplitude of the smallest peak amplitude voltage appearing across said secondary windings is at least equal to said value and the minimum peak amplitude of each of the remaining voltages appearing across said secondary windings is greater by at least said value than the sum of the maximum peak amplitudes of all of the secondary voltages having smaller peak amplitudes, a utilization circuit, and means serially connecting said secondary windings and said utilization circuit.

5. Apparatus for producing a signal having a peak amplitude at least equal to a predetermined value comprising a plurality of sources for producing alternating voltages having nominally equal frequencies and random phase relationships with respect to one another, a similar plurality of transformers each having a primary winding and a secondary winding, means for respectively applying said source voltages across said primary windings, said transformers having turns ratios so that initially the peak amplitude of the smallest peak amplitude voltage appearing across said secondary windings is at least equal to said value and the peak amplitude of each of the remaining voltages appearing across said secondary windings is greater by at least said value than the sum of the peak amplitudes of all of the secondary voltages having smaller peak amplitudes, means for blocking any one of said secondary voltages when its amplitude does not meet the initial amplitude relationships, a utilization circuit, and means serially connecting said secondary windings and said utilization circuit.

6. Apparatus for producing a signal having a peak amplitude at least equal to a predetermined value comprising a plurality of sources for producing alternating voltages having nominally equal frequencies, random phase relationships with respect to one another and amplitudes where the minimum amplitude of the smallest peak amplitude voltage is at least equal to said value and the minimum peak amplitude of each of the remaining voltages is greater by at least said value than the sum of the maximum peak amplitudes of all of the voltages having smaller peak amplitudes, a similar plurality of identical transformers each having primary and secondary windings, means for applying each of said voltages to respective primary windings only when its amplitude falls within its prescribed limits, a utilization circuit, and means serially connecting said secondary windings and said utilization circuit.

7. Apparatus for producing a signal having a peak amplitude at least equal to a predetermined value comprising a plurality of sources for producing alternating voltages having nominally equal frequencies and random phase relationships with respect to one another, means associated with said sources for initially establishing the peak amplitudes of their voltages so that the smallest of said amplitudes is at least equal to said value and each of the remaining of said amplitudes is greater by at least said value than the sum of all of the smaller of said amplitudes, means for summing said voltages, and means for blocking from said summing means any one of said voltages when its amplitude does not fall within its prescribed limits.

References Cited in the file of this patent

UNITED STATES PATENTS

| | | |
|---|---|---|
| 2,753,454 | Parker | July 3, 1956 |
| 3,015,210 | Williamson | Jan. 2, 1962 |